UNITED STATES PATENT OFFICE 2,479,971

MONOALKAMINE ESTERS OF PYRROLE-3-CARBOXYLIC ACIDS

Theodore F. Scholz, Plainfield, N. J., assignor to American Cyanamid Company, New York, N. Y., a corporation of Maine No Drawing. Application November 13, 1946,
Serial No. 709,403

8 Claims. (Cl. 260—313)

This invention relates to alkamine esters of 1-carbocyclic substituted pyrrole - 3 - carboxylic acids.

Certain esters of pyrrole-3-carboxylic acids have been prepared but the alkamine esters of 1-hydrocarbon substituted pyrrole-3-carboxylic acids are not known and these esters cannot be readily prepared by ordinary means. It is with these esters that the present invention is concerned and they may be represented by the following structural formula:

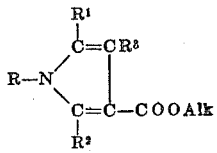

in which R is a hydrocarbon radical saturated or unsaturated, $R_1$, $R_2$ and $R_3$ are hydrogen or alkyl, and Alk is dialkylaminoalkyl. The esters of the present invention are useful for a number of purposes, some being activators for rubber accelerators and some exhibiting local anaestetic power.

The esters of the present invention may be prepared by catalyzed alcoholysis of the corresponding alkyl esters, using an alkali metal alcoholate as the catalyst. The alkyl esters are in general prepared from the dialkyl esters of the corresponding pyrrole-3,4-dicarboxylic acids. This may be effected by hydrolysis with caustic alkali and anhydrization of the diacid, formation of a half alkyl ester, and decarboxylation. The present invention is, of course, not limited to this method of obtaining the intermediates.

The most readily formed esters are those containing methyl groups in the 2,5 position. These compounds are prepared from the corresponding dialkyl esters of pyrrole-3,4-dicarboxylic acids, which in turn are produced by the Knorr synthesis from diacetosuccinates and amines. The synthesis is, however, useful with other diketo esters, such as the dipropionosuccinates, from which the Knorr synthesis produces pyrroles having ethyl groups on the 2 and 5 carbon atoms. In a similar way other alkyl substituents may be introduced.

The alkamine esters of the present invention are obtainable in the form of the free bases or in the form of their salts with various strong acids, such as hydrochlorides. When used as local anaesthetics the latter form is preferred as it is in general more water soluble. The free bases, however, show greater effectiveness as activators for rubber accelerators.

The invention will be illustrated in greater detail in conjunction with the following specific examples which are typical illustrations. The parts are by weight and temperatures are uncorrected unless otherwise specified.

Example 1

The hydrochloride of β-diethylaminoethyl, 1-cyclohexyl-2,5-dimethylpyrrole-3-carboxylate

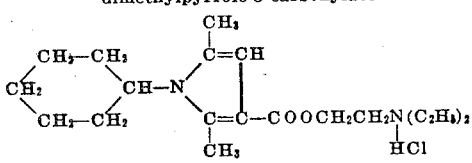

48 parts of ethyl-1-cyclohexyl-2,5-dimethylpyrrole-3,4-dicarboxylate are prepared by condensing diethyldiacetosuccinate with cyclohexylamine, hydrolyzing with caustic soda, forming the anhydride by reaction with acetic anhydride, followed by producing the half ester by reaction with ethyl alcohol and decarboxylating by heating under a pressure of 20 mm. The product is mixed with 113 parts of β-diethylaminoethanol containing a small amount of metallic sodium. The reaction mixture is heated at a gradually rising temperature up to 150° C. When the boiling point rises above 150° C. the pressure is lowered to 15 mm. and unreacted amino alcohol distilled out.

A residue is obtained which is extracted with ether, the ether extracts washed with brine and dried and then dry hydrogen chloride is introduced until the solution is neutral to litmus. A solid is obtained which is filtered and dried and melts at 125.4–129.8° C. (corr.). It is soluble in water, chloroform and benzene and insoluble in anhydrous ether and petroleum ether.

The above procedure is followed using methyl alcohol instead of ethyl alcohol to produce the half ester. The reaction proceeds in the same manner as with the ethyl ester.

Example 2

The hydrochloride of β-diethylaminoethyl, 1-phenyl-2,5-dimethylpyrrole-3-carboxylate

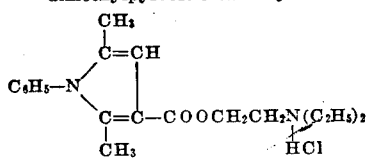

23 parts of ethyl - 1 - phenyl - 2,5 - dimethylpyrrole - 3 - carboxylate are prepared from 1 - phenyl-2,5-dimethyl-pyrrole-3,4-dicarboxylic acid by reacting with acetic anhydride to form the anhydride producing the ethyl half ester by reaction with ethanol and decarboxylation by heating under reduced pressure. The product is mixed with 55 parts of β-diethylaminoethanol containing a small amount of sodium. The mixture is heated until the ethyl alcohol gradually distills off. After all of the ethyl alcohol has been removed the pressure is lowered and unreacted amino alcohol removed under a vacuum.

A residue is obtained and extracted with ether, washed with brine and dried. A solution of dry hydrogen chloride in anhydrous ether is gradually added with stirring until neutrality to litmus is obtained. A solid precipitates which is filtered off, washed with dry ether and dried in vacuo. The product is soluble in water, chloroform and benzene and insoluble in anydrous ether and petroleum ether.

Example 3

The hydrochloride of β-diethylaminopropyl-1-cyclohexyl-2,5-dimethylpyrrole-3-carboxylate

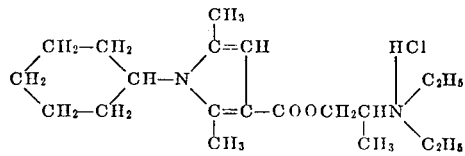

The procedure of Example 1 is followed, substituting the corresponding amount of β-diethylaminopropanol for the β-diethylaminoethanol. A solid product is obtained having substantially the same physical properties as that of Example 1.

Example 4

The hydrochloride of β-dipropylaminopropyl-1-phenyl-2,5-dimethylpyrrole-3-carboxylate

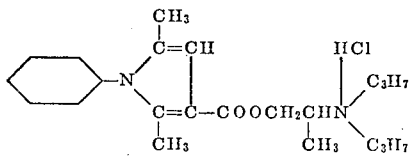

The procedure of Example 2 is followed, but a corresponding amount of β-dipropylaminopropanol is substituted for the β-diethylaminoethanol. A solid product is obtained having substantially the same physical characteristics as the product of Example 2.

Example 5

The hydrochloride of β-diethylaminoethyl-1,2,4-trimethylpyrrole-3-carboxylate

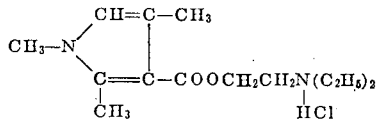

73 parts of ethyl-1,2,4-trimethylpyrrole-3-carboxylate-5-carboxylic acid are added to 120 parts of fluorene and heated at atmospheric pressure. The mixture of solids melts with vigorous evolution of carbon dioxide and the heating is continued until gas is only feebly evolved. The temperature rises to approximately 150° C. Thereupon the pressure is lowered to 4 mm. and a fraction boiling below 135° C. collected. The mixture, smelling strongly of fluorene, constitutes about 101 parts and is suspended in 87 parts of β-diethylaminoethanol to which a small amount of sodium has been added as a catalyst. The mixture is heated until the ethyl alcohol set free is distilled off and the temperature rises to about the vaporization temperature of the pure amino alcohol. Pressure is then reduced and the excess amino alcohol is distilled off under a low vacuum, care being taken to maintain the temperature sufficiently high to keep the fluorene molten. The last traces of amino alcohol require lowering of the pressure to 20 mm.

The residue after cooling is thoroughly extracted with ether, the ether extracts washed with brine and dried. A solution of dry hydrogen chloride in anhydrous ether is slowly added with vigorous stirring until the mixture is neutral to litmus. The hydrochloride of the ester is an oily precipitate and solidifies almost immediately. It is filtered, washed with dry ether and dried under a vacuum. The product melts at 152.4–155.9° C. (corr.). It is soluble in water, chloroform and ethyl alcohol and insoluble in ethyl ether.

Example 6

The hydrochloride of β-dimethylaminoethyl, 1-phenyl-2,5-dimethylpyrrole-3-carboxylate

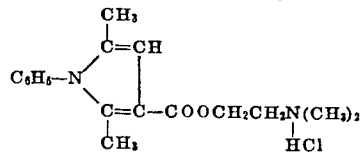

The procedure of Example 2 is followed but instead of using 55 parts β-diethylaminoethanol the stoichiometrically corresponding amount of β-dimethylaminoethanol is used. The product obtained resembles that of Example 2 and shows substantially the same chemical properties.

Example 7

The hydrochloride of γ-dipropylaminopropyl, 1-cyclohexyl-2,5-dimethylpyrrole-3-carboxylate

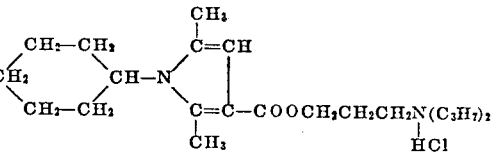

The procedure of Example 1 is followed but instead of 113 parts of β-diethylaminoethanol the stoichiometrically corresponding amount of γ-dipropylaminopropanol is employed. The reaction proceeds in the same manner except that the temperature at which the unreacted amino alcohol distills out is slightly higher and a product obtained in the form of a solid having substantially the same chemical properties as that of Example 1.

In the foregoing examples the catalyst sodium is added to the β-diethylaminoethanol, where it, of course, reacts to produce the alcoholate. The addition of the sodium is in no sense critical. It may be added to the reaction mixture, or it may be reacted either with the amino alcohol or with ordinary ethyl alcohol to form an alcoholate and the ready formed alcoholate added to the reaction mixture. The relative insensitiveness of the reaction to the method of addition of the sodium alcoholate and the smoothness of the reaction is in marked contrast to the ordinary characteristics of amino alcohols and their esters, which usually are sensitive to oxidation in alkaline solution. No reason is advanced here why the present reaction proceeds readily in spite of this normal tendency to side reactions.

The amount of alkali metal alcoholate present is not critical, but it should be in catalytic amounts, that is to say amounts which are sufficient to vigorously catalyze the reaction but far below stoichiometric proportions. Good results are obtained with amounts of alcoholate of the order of $\frac{1}{10}$ mole per mole of the carbethoxypyrrole. This proportion is not critical and the term "catalytic amounts" will be used in the claims in its ordinary sense of small amounts far below stoichiometric proportions. Sodium can be replaced by potassium, but this presents no advantage in the reaction and, therefore, does not economically warrant the higher cost of potassium. For this economic reason the sodium alcoholate is preferred as the catalyst.

In many of the examples the hydrochlorides of the products are described. These salts are most readily prepared and where the product is of utility as a local anaesthetic are preferred because they are readily soluble in water. The esters, however, are capable of reacting with other strong acids to produce the corresponding salts.

This application is in part a continuation of my copending application, Serial No. 496,954, filed July 31, 1943, now abandoned.

I claim:

1. An alkylamine ester selected from the group consisting of alkamine esters of pyrrole-3-carboxylic acids having the formula:

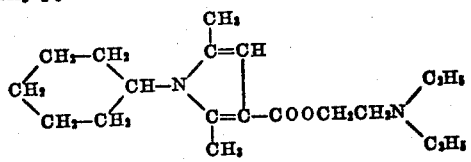

in which Alk is alkyl, $n$ is an integer greater than zero, and R is an unsubstituted carbocyclic hydrocarbon radical and addition salts of the esters with strong acids.

2. Compounds according to claim 1 in which the hydrocarbon radical is cyclohexyl.

3. Compounds according to claim 1 in which the hydrocarbon radical is phenyl.

4. Diethylaminoethyl - 1 - cyclohexyl - 2,5 - dimethylpyrrole-3-carboxylate having the formula:

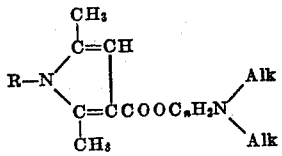

5. A method of preparing an alkamine ester of a 2,5-dimethylpyrrole - 3 - carboxylic acid having the formula:

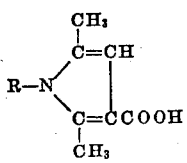

in which R is an unsubstituted carbocyclic hydrocarbon radical which comprises heating an alkyl ester of said acid with a dialkylaminoalkanol in the presence of catalytic amounts of an alkali metal alcoholate.

6. A diethylaminoethyl-1-phenyl-2,5-dimethylpyrrole-3-carboxylate having the formula:

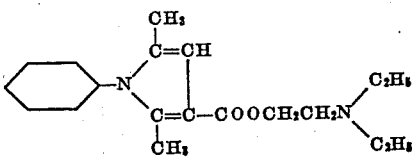

7. A method according to claim 5 in which the hydrocarbon is cyclohexyl.

8. A method according to claim 5 in which the hydrocarbon is phenyl.

THEODORE F. SCHOLZ.

REFERENCES CITED

The following references are of record in the file of this patent:

Gilman et al., J. Am. Chem. Soc., vol. 47 (January, 1925), pp. 245–254.